Patented Jan. 18, 1927.

1,614,560

UNITED STATES PATENT OFFICE.

LESTER KIRSCHBRAUN, OF CHICAGO, ILLINOIS.

COMBUSTIBLE FUEL AND PROCESS OF MAKING SAME.

No Drawing. Application filed August 16, 1920, Serial No. 404,016. Renewed July 9, 1926.

This invention relates to combustible fuels and process of making same and refers more particularly to an emulsion of petroleum oil, water and an emulsifying agent.

The object of the invention is to produce a combustible fuel which not only makes a relatively permanent emulsion or one in which the oil and water will not separate or stratify but also produces a product in which all the constituents thereof are more or less completely volatilized at relatively low temperatures. In this connection it may be noted that the product is one which can be completely burned in ordinary internal combustion engines without leaving any residues on the cylinder walls or valve seats of such engine. Heretofore metallic soaps have been used as emulsifying agents to make an emulsion of oil and water as for example the sodium or other metallic soaps of the fatty acids. These, however, do not completely burn up except at relatively high temperatures.

In the present invention, the emulsifying agent is readily volatilized. More specifically I use sulphonic acid obtained from sludge tars or acid sludges which result from the treatment of petroleum oils. The characteristics of sulphonic acid are well known in the art and it is now available in quantities as a commercial article.

The process may be carried out as follows: I mix equal quantities of the sulphonic acid and gasoline and add to this mixture approximately 20% of water. This makes a mixture of about 50 parts of sulphonic acid, 50 parts of gasoline and 20 parts of water. This sulphonic acid may have a specific gravity of 1.03. The above ingredients are effectively mixed by means of thorough agitation which results in a more or less turbid blue liquid which I term as mother liquor. This mother liquor has the appearance of a colloidal solution of sulphonic acid or possibly its hydrates in the gasoline as the continuous phase. I have sometimes found it advantageous to heat the liquids while being mixed to facilitate the colloidal action although this may not be necessary in every instance. Starting with this mother liquor I incorporate a selected portion with the gasoline which is to be emulsified the proportions used varying with the amount of water which it is desired to hold in suspension. For example, if it is desired to emulsify and hold in suspension approximately 5% of water with gasoline I add the mother liquor in such proportion that it will contain the sulphonic acid to the extent of ½ of 1% relative to the gasoline. I then add water preferably in excess of the amount which it is desired to retain in suspension by violent agitation to produce a thin white milky emulsion in which the gasoline constitutes the continuous phase and the water the dispersed phase. The emulsion is then allowed to stand for a short time during which the excess of water may be withdrawn. One product that I made by this process contained ½ of 1% of sulphonic acid, 6% of water and the balance gasoline. The best results are not obtained by adding sulphonic acid and water directly to the gasoline. For example, if I add 6% of water and ½ of 1% of sulphonic acid directly to 100 parts of gasoline, I do not obtain satisfactory results, particularly where ordinary mechanical agitation is used. In other words, it is desirable to first prepare the mother liquor so as to have a concentrated colloidal dispersion which is then mixed with the gasoline. This results in a much more effective and stable emulsion.

It may be desirable in order to get a finer dispersion either to pass the mother liquor through a homogenizer under several thousand pounds pressure or by passing the emulsion after the mother liquor has been mixed with the gasoline through such a homogenizer at such a pressure.

Instead of gasoline, I may use pressure distillate obtained from the cracking of petroleum oil or the light oil cuts from crude petroleum, as for example a mixture of the gasoline, kerosene and gas oil cuts or I may emulsify fuel oil or petroleum tars in this manner.

This emulsion may be used either as an explosive mixture in an internal combustion engine or for generating heat or power.

I claim as my invention:

1. A process of making a combustible fuel consisting in emulsifying gasoline and water by means of a mother liquor containing a sulphonic acid.

2. A combustible fuel being a relatively permanent emulsion and consisting of petroleum oil, water and sulphonic acid.

3. A combustible fuel being a relatively permanent emulsion and consisting of petroleum oil, water and sulphonic acid, the sulphonic acid comprising not in excess of one percent of the product.

4. A process of making a combustible mixture comprising making a mother liquor of hydrocarbon oil, water and an oil soluble emulsifying agent, and diluting said mother liquor with further quantities of combustible hydrocarbons.

5. A process of making a combustible mixture comprising making a mother liquor of hydrocarbon oil, water and an oil soluble emulsifying agent, in which the hydrocarbon oil constitutes the prepondering portion of the mother liquor, and diluting said mother liquor with further quantities of combustible hydrocarbons.

6. A process of making a combustible mixture, comprising making a mother liquor of hydrocarbon oil, water and sulphonic acid, and diluting said mother liquor with further quantities of combustible hydrocarbons.

7. A process of making a combustible mixture, comprising making a mother liquor of hydrocarbon oil, water and an oil soluble emulsifying agent, and diluting said mother liquor with further quantities of combustible hydrocarbons, thereby producing an emulsion with a predetermined amount of water as the internal phase.

LESTER KIRSCHBRAUN.